United States Patent
Chan et al.

(10) Patent No.: US 8,935,309 B1
(45) Date of Patent: Jan. 13, 2015

(54) GENERATION OF CONSTRAINED PSEUDO-RANDOM BINARY SEQUENCES (PRBS)

(75) Inventors: Kai Keung Chan, Fremont, CA (US); Xin-Ning Song, San Jose, CA (US)

(73) Assignee: SK hynix memory solutions inc., San Jose, CO (US)

( * ) Notice: Subject to any disclaimer, the term of this patent is extended or adjusted under 35 U.S.C. 154(b) by 391 days.

(21) Appl. No.: 13/445,277

(22) Filed: Apr. 12, 2012

Related U.S. Application Data (60) Provisional application No. 61/478,368, filed on Apr. 22, 2011.

(51) Int. Cl.
   *G06F 7/58* (2006.01)

(52) U.S. Cl.
   USPC ............................................. 708/250

(58) Field of Classification Search
   None
   See application file for complete search history.

(56) References Cited

U.S. PATENT DOCUMENTS

| | | | |
|---|---|---|---|
| 6,195,025 B1* | 2/2001 | Hassner et al. | 341/59 |
| 6,392,829 B1* | 5/2002 | Stoutenburgh et al. | 360/39 |
| 2003/0011917 A1* | 1/2003 | Bliss et al. | 360/39 |
| 2003/0026028 A1* | 2/2003 | Ichihara et al. | 360/65 |
| 2004/0205095 A1* | 10/2004 | Gressel et al. | 708/253 |
| 2007/0244951 A1* | 10/2007 | Gressel et al. | 708/252 |

OTHER PUBLICATIONS

Brickner et al., "Design of a Rate 6/7 Maximum Transition Run Code", IEEE Transactions on Magnetics, vol. 33, No. 5, pp. 2749-2751, Sep. 1997.
Cideciyan et al., "Maximum Transition Run Codes for Generalized Partial Response Channels", IEEE Journal on Selected Areas in Communications, vol. 19, No. 4, pp. 619-634, Apr. 2001.
Moon et al., "Maximum Transition Run Codes for Data Storage Systems", IEEE Transactions on Magnetics, vol. 32, No. 5, pp. 3992-3994, Sep. 1996.
Nikolic et al., "Rate 8/9 Sliding Block Distance-Enhancing Code with Stationary Detector", IEEE Transactions on Magnetics, vol. 37, No. 3, pp. 1168-1174, May 2001.

* cited by examiner

*Primary Examiner* — David H Malzahn
(74) *Attorney, Agent, or Firm* — Van Pelt, Yi & James LLP (57) ABSTRACT

A signal is generated by obtaining an unconstrained random bit sequence. The unconstrained random bit sequence is modified to satisfy a constraint and the modified random bit sequence is output.

18 Claims, 10 Drawing Sheets

GENERATION OF CONSTRAINED PSEUDO-RANDOM BINARY SEQUENCES (PRBS)

CROSS REFERENCE TO OTHER APPLICATIONS

This application claims priority to U.S. Provisional Patent Application No. 61/478,368 entitled A MODIFIED PSEUDO-RANDOM BINARY SEQUENCE (PRBS) TO AID MANUFACTURING FOR DISK DRIVE APPLICATION filed Apr. 22, 2011 which is incorporated herein by reference for all purposes.

BACKGROUND OF THE INVENTION

During the manufacturing process, a storage system (such as a hard disk drive (HDD) system) writes to the storage media and then reads back the signal to perform training. Storage system parameters (such as equalization filter coefficients, channel target coefficients, and/or soft output Viterbi coefficients) are determined and programmed during this training process. Some training techniques write unconstrained pseudo-random bit sequences to the storage medium. Although unconstrained pseudo-random bit sequences may be easy to generate, it may not be desirable to use such sequences when determining and setting certain storage system parameters. For example, a soft output Viterbi decoder may be expecting a signal from storage media that is constrained in some way (e.g., run length limited (RLL) constrained and/or maximum transition run (MTR) constrained). Training a soft output Viterbi decoder using an unconstrained bit sequence may produce a decoder which is configured with less than optimal parameters. A convenient and/or computationally inexpensive technique for generating RLL and/or MTR constrained signals would be desirable, for example for use in training a storage system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments described herein, one or more constraints (also referred to as a code) are enforced or otherwise applied over a block of length N (e.g., a block consisting of ($b_0, \ldots, b_{N-1}$), a block consisting of ($b_N, \ldots, b_{2N-1}$), and so on). N is referred to as the block length. A maximum transition run (MTR) constraint is one such type of constraint which may be enforced over a block. An MTR constraint limits the number of consecutive bit transitions (e.g., low to high or high to low). MTR constraints are sometimes used in hard disk drive storage systems to obtain a coding gain in maximum likelihood detectors. For example, a signal written to storage media may be MTR constrained. A run length limited (RLL) constraint limits a run of 0's or 1's. In some storage applications, an RLL constraint is applied to a signal written to storage media to prevent timing synchronization loss.

Figure 1:
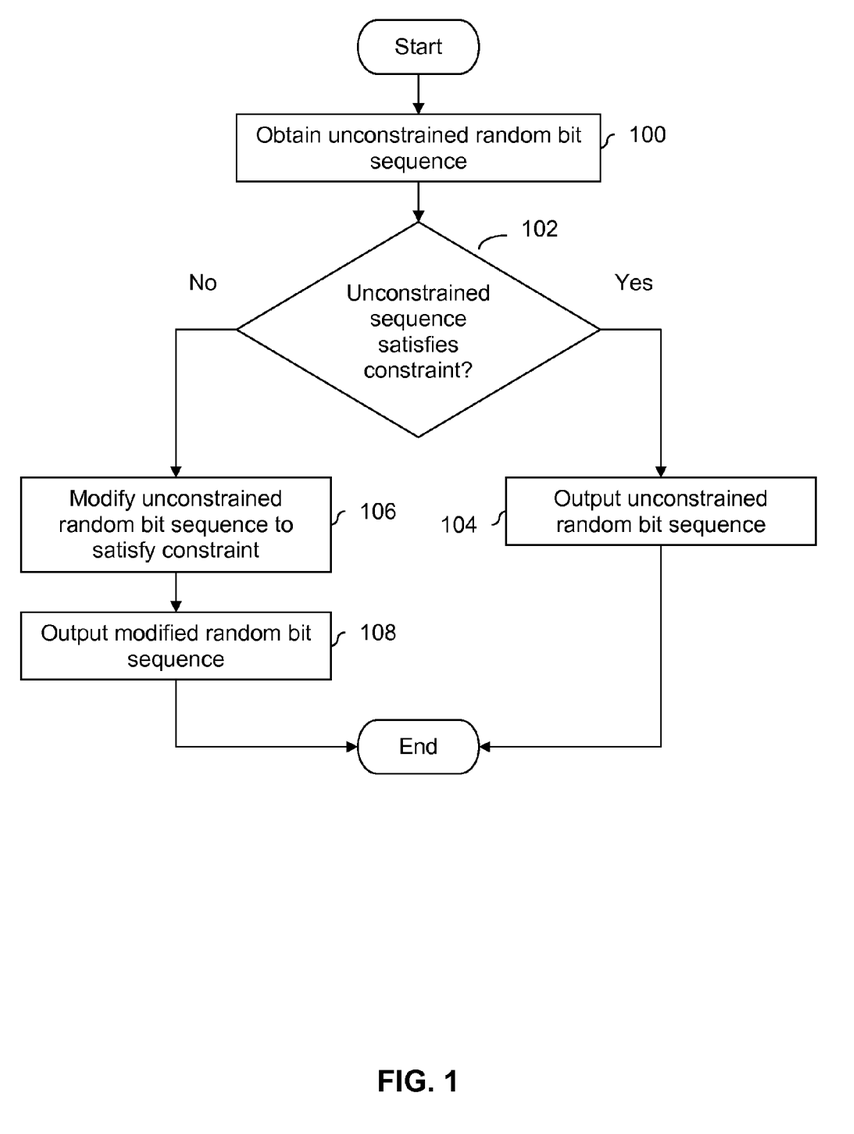
FIG. 1 is a diagram showing an embodiment of a process for generating a constrained signal.

FIG. 1 is a diagram showing an embodiment of a process for generating a constrained signal. In various embodiments, the constrained signal is MTR and/or RLL constrained. In some embodiments, the generated signal is used to test, train, or simulate a system, such as a storage system. Some storage systems, for example, constrain a signal which is written to storage media (e.g., hard disk drive media) to be MTR and/or RLL constrained. At 100, an unconstrained random bit sequence is obtained. For example, a pseudo-random bit sequence (PRBS) generator may be used to generate the signal (e.g., on the fly, using a configurable seed and generator polynomial).

At 102, it is determined if the unconstrained sequence satisfies a constraint. For example, sometimes the unconstrained sequence generated at 100 randomly satisfies a constraint. In some embodiments, a constraint is programmable. Using an MTR constraint as an example, a block length (N) is programmable and/or a length of the run length constraint (e.g., a run length limit of 1, 2, 3, etc.) is programmable. In some embodiments, more than one constraint is enforced and a check at 102 checks for two or more constraints.

If the unconstrained sequence satisfies a constraint at 102, the unconstrained random bit sequence is output at 104. Otherwise, at 106, an unconstrained random bit sequence is modified to satisfy a constraint. In some embodiments, a bit (e.g., a next bit out) is flipped to comply with a constraint where leaving that bit unchanged would violate the constraint. Although some embodiments described herein describe bit flipping, a variety of techniques may be used. Some other examples include insertion of one or more extra bits to break up a run of 0's or 1's (e.g., inserting the opposite value in the middle of a run of 0's or 1's) or break up successive transitions (e.g., by holding the signal high or low as appropriate in the middle of the successive transitions). Some other exemplary techniques include removing one or more bits from a sequence or mixing up or otherwise re-ordering bits in a sequence in order to enforce a constraint on the sequence. At 108, the modified random bit sequence is output.

In some embodiments, a signal generation process (e.g., the one shown herein) checks for constraint violations and/or outputs a constrained signal a bit at a time. For example, the unconstrained random bit sequence obtained at 100 may be input a bit at a time, and the checking at 102 and/or outputting at 104 or 108 similarly occurs a bit at a time. Alternatively, checking for a constraint and/or outputting a constrained signal may occur on a larger amount of information. For example, checking if a constraint is satisfied at 102 may be performed a block (i.e., N bits) at a time and/or outputting at 104 or 108 may occur a block at a time.

In various embodiments, various systems perform the signal generation process shown in FIG. 1; some examples are shown below. In some embodiments, a signal generator configured to generate a constrained signal includes a semiconductor component, such as an application-specific integrated circuit (ASIC), a field-programmable gate array (FPGA), or an embedded microprocessor. In some embodiments, the technique is performed using a computer program product embodied on a computer readable storage medium.

Figure 2:
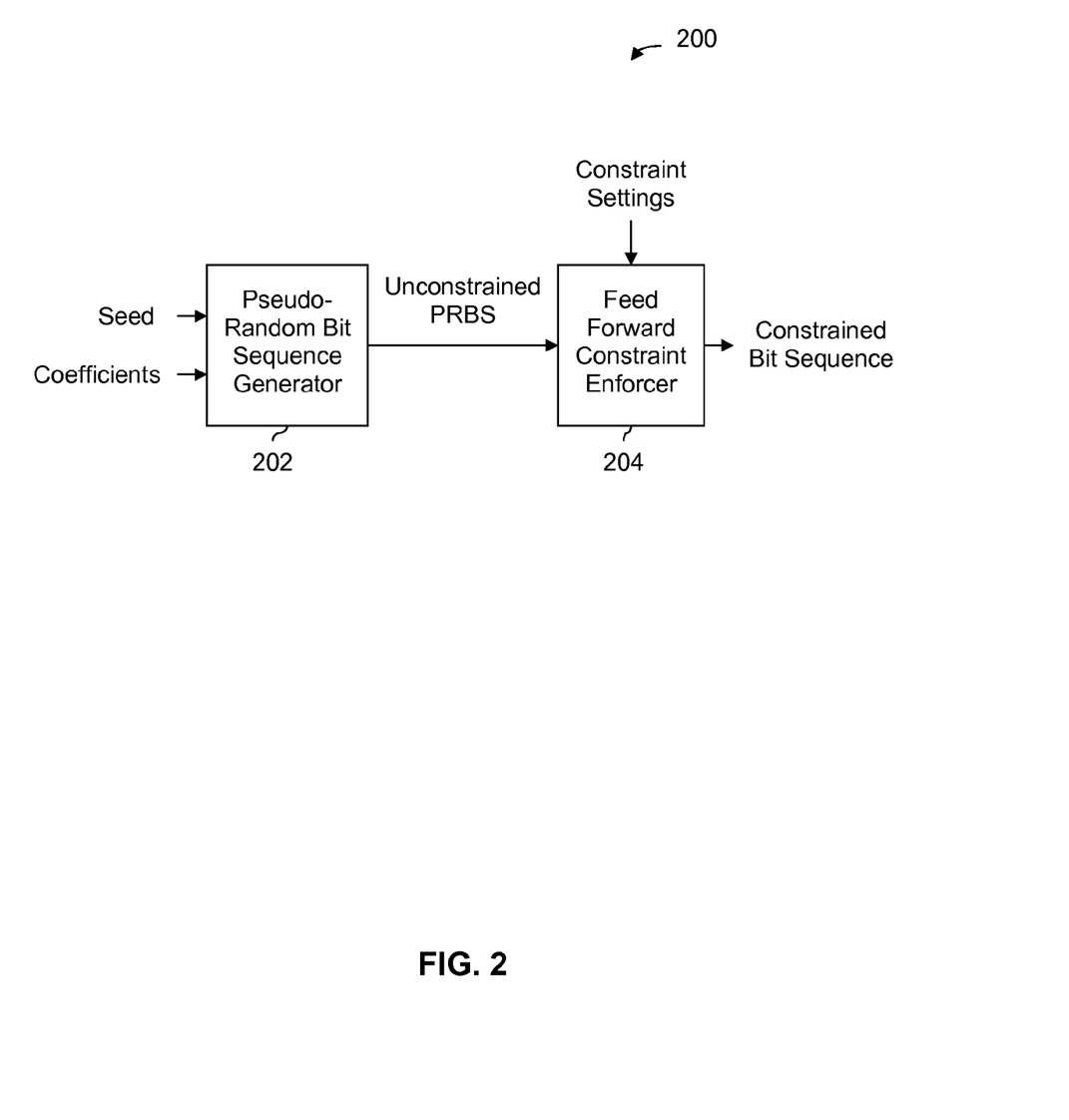
FIG. 2 is a diagram showing an embodiment of a feed forward signal generator configured to generate a constrained signal.

FIG. 2 is a diagram showing an embodiment of a feed forward signal generator configured to generate a constrained signal. In signal generator 200, pseudo-random bit sequence (PRBS) generator 202 generates an unconstrained pseudo-random bit sequence using a seed and one or more coefficients. For example, generator 202 may generate the pseudo-random bit sequence using a generator polynomial, such as $P(x)=X^{12}+X^7+X^4+X^3+1$ and the coefficients input to generator 202 are the coefficients of the polynomial (e.g., in the example above: (1 0 0 0 0 1 0 0 1 1 0 0 1)). The seed may be the initial value "loaded" into the generator polynomial.

The unconstrained bit sequence is passed from generator 202 to feed forward constraint enforcer 204. One or more constraint settings are input to feed forward constraint enforcer 204 and describe the one or more constraints which applied to the unconstrained PRBS. In various embodiments, constraint settings include: a block length, an RLL constraint (e.g., whether a run length is limited to 1, 2, 3, etc.), and/or an MTR constraint (e.g., whether a number of successive transitions is limited to 1, 2, 3, etc.). Feed forward constraint enforcer 204 outputs a constrained bit sequence. In some embodiments, the constrained bit sequence is output a bit at a time.

Figure 3:
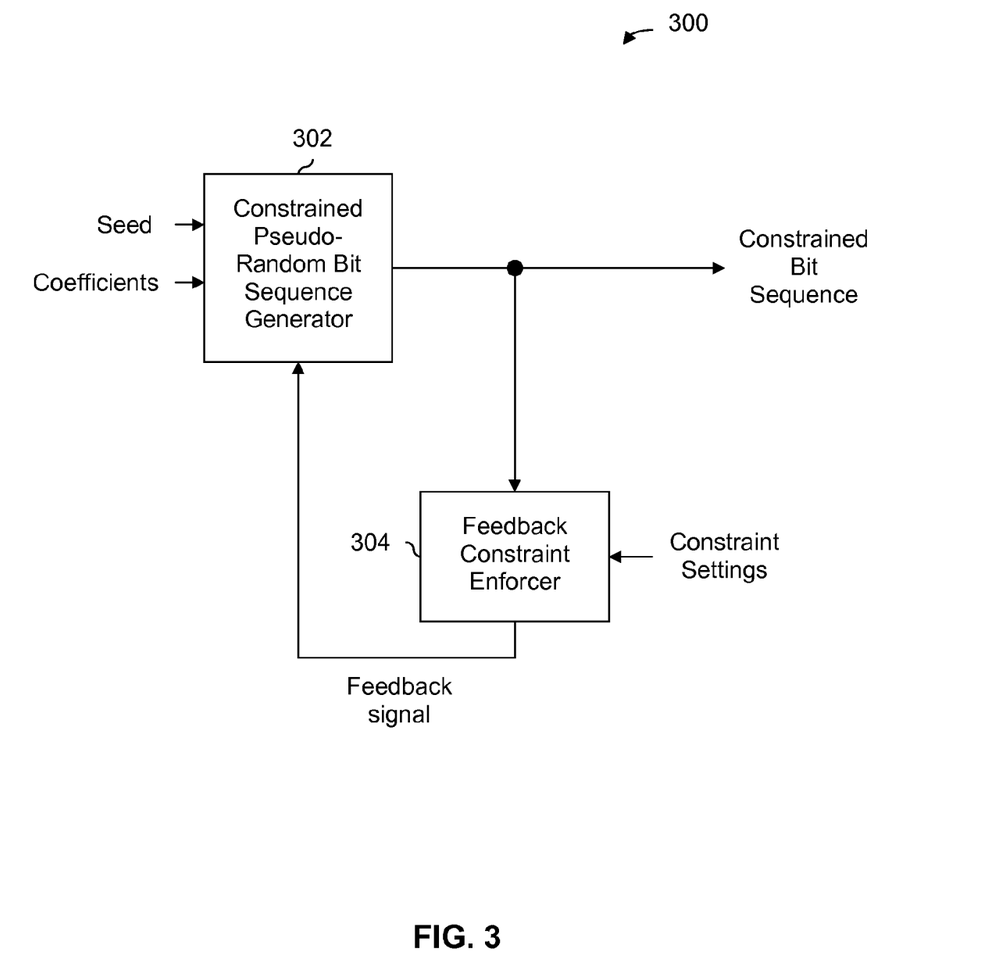
FIG. 3 is a diagram showing an embodiment of a feedback signal generator configured to generate a constrained signal.

FIG. 3 is a diagram showing an embodiment of a feedback signal generator configured to generate a constrained signal. In signal generator 300, constrained pseudo-random bit sequence generator 302 generates a constrained bit sequence using a seed, coefficients, and a feedback signal from feedback constraint enforcer 304. In some embodiments, the feedback signal is combined with and/or used to modify a bit sequence generated using the seed and coefficients. Feedback constraint enforcer 304 generates a feedback signal using constraint settings, for example which specify the constraint(s) which the constrained bit sequence output needs to satisfy. As described above, in various embodiments, the constraint settings may include a variety of settings.

For those embodiments where a constraint enforced on a generated signal includes an MTR constraint and/or an RLL constraint, techniques to detect and/or enforce an MTR and/or RLL constraint are used. The following figure shows one technique for detecting and/or enforcing an MTR and/or RLL constraint.

Figure 4:
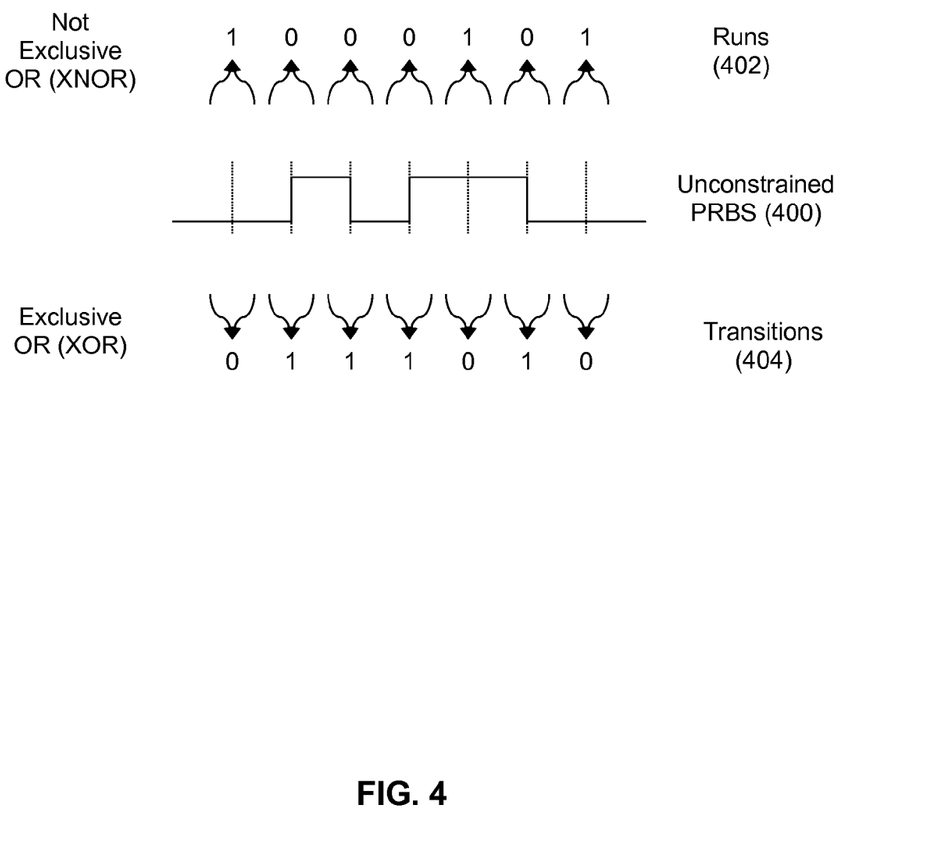
FIG. 4 is a signal diagram showing an embodiment of an unconstrained PRBS for which an RLL and MTR constraint is monitored.

FIG. 4 is a signal diagram showing an embodiment of an unconstrained PRBS for which an RLL and MTR constraint is monitored. For convenience to demonstrate the technique, unconstrained PRBS 400 is monitored for compliance with both an RLL constraint as well as an MTR constraint, but some other embodiments may enforce only one of the two constraints, and/or some other constraint besides an MTR or RLL constraint.

In the example shown, an exclusive OR (XOR) on adjacent bits is performed to detect transitions, where a 0 corresponds to no transition (e.g., a signal remains high or remains low) and a 1 corresponds to a transition. See, for example, transitions 404 which flags transitions in unconstrained PRBS 400. A not exclusive OR (XNOR), an exclusive OR with the output inverted, is used to detect runs where a 1 corresponds to a run (e.g., a signal remains high or a signal remains low) and a 0 corresponds to a transition. See, e.g., runs 402 which detects runs in unconstrained PRBS 400.

Using two counters (not shown), a current run length and a current transition run may be monitored. In this example, the counters are reset at each pre-defined block boundary, where this boundary is set by the coding length. In this particular example, this block length is not a moving window.

In embodiments which use such counters, the count(s) may be used to detect when a bit may need to be changed in order to satisfy a constraint. For example, if an MTR constraint of 2 (i.e., a maximum of two transitions in a row) is to be applied to unconstrained PRBS 400, then when a transitions counter is at a count of 2, a next bit in unconstrained PRBS 400 is flipped if the next bit in transitions 404 is a 1 (which corresponds to a third consecutive transition, which would violate the MTR constraint of 2, so the corresponding bit in unconstrained PRBS 400 is flipped to stop the run of transitions at 2). In various embodiments, delay elements are used as needed (e.g., to buffer one or more bits associated with unconstrained PRBS 400 while it is being determined whether to perform bit flipping) and appropriate counters may be reset in the event a bit flipping occurs.

Although this example may describe certain components and/or arrangements in order to describe the technique, other components and/or arrangements (e.g., optimized for lower latency and/or fewer hardware components) may be used. The examples described herein are merely exemplary and are not intended to be limiting.

Figure 5:
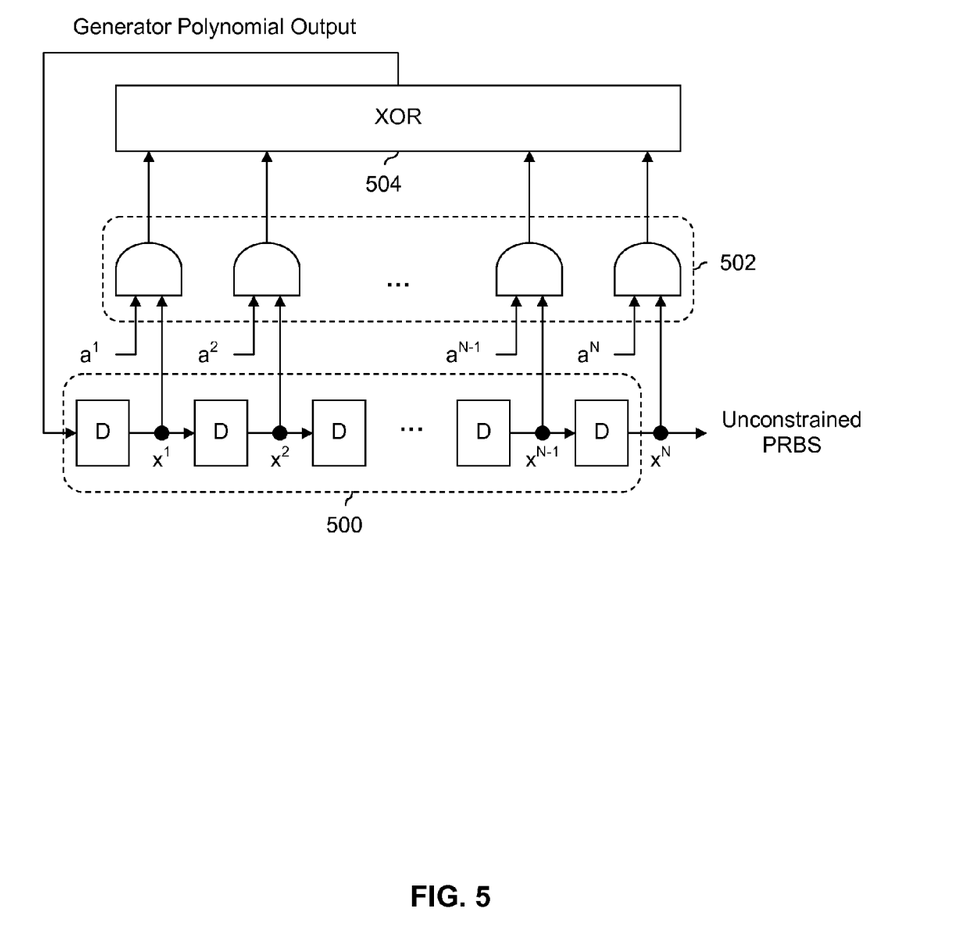
FIG. 5 is a diagram showing an embodiment of a PRBS generator.

FIG. 5 is a diagram showing an embodiment of a PRBS generator. In some embodiments, PRBS generator 202 in FIG. 2 is implemented as shown. Chain 500 (in this example, comprising of a chain of D flip flops) is initially loaded with the seed (not shown). In various embodiments, a seed is loaded using an array of multiplexers (e.g., where the input pin of each multiplexer which corresponds to the seed bit is selected during an initial cycle, and subsequently, the other input pin of the multiplexer is selected). Alternatively, a seed may be loaded using control pins of a D flip flop to force the output of the D flip flop to be a 0 or a 1 (e.g., using a reset or set pin). In various embodiments, a seed may be programmable or may be fixed or hard-coded.

The output from each D flip flop in chain 500 is passed to an array of AND gates (502). The values $a^1$ through $a^N$ which are also input to the array of AND gates (502) are the coefficients which are input to a PRBS generator and reflect a desired generator polynomial (e.g., $P(x)=X^{12}+X^7+X^4+X^3+1$). The outputs of AND array 502 are passed to XOR gate 504, the output of which is fed into the first D flip flop in chain 500. An unconstrained PRBS is shifted out by chain 500 a bit at a time.

Figure 6:
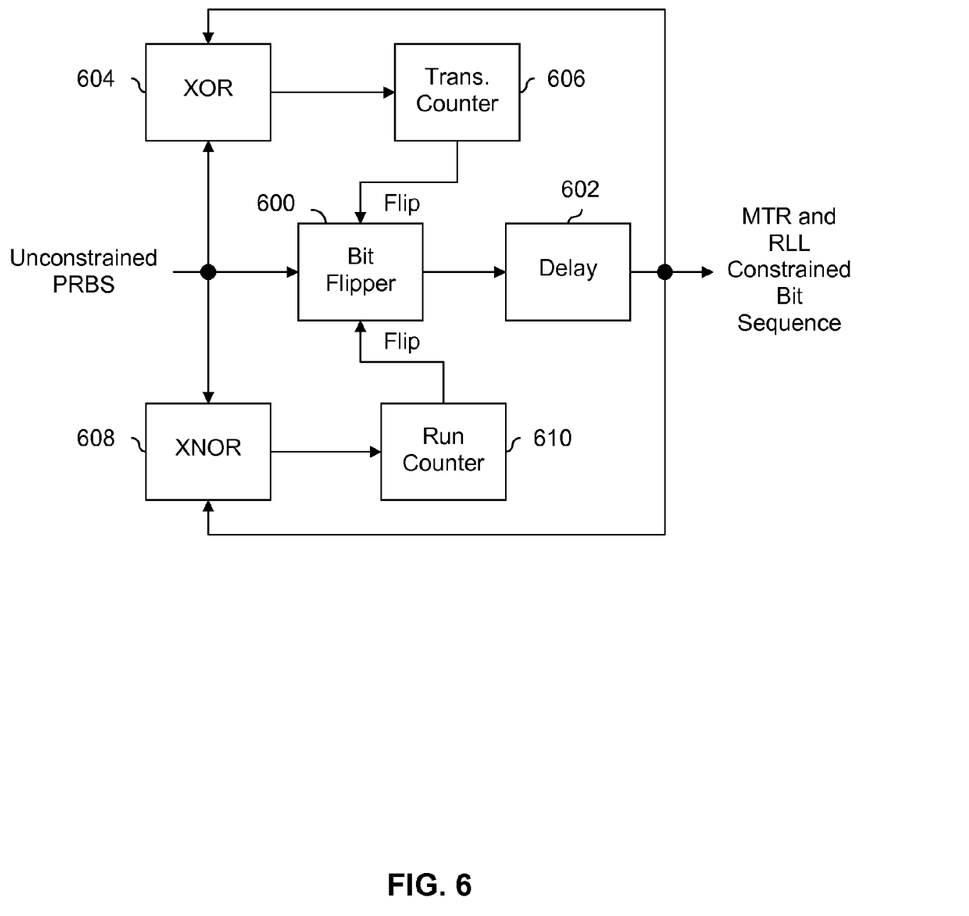
FIG. 6 is a diagram showing an embodiment of a feed forward constraint enforcer.

FIG. 6 is a diagram showing an embodiment of a feed forward constraint enforcer. In some embodiments, feed forward constraint enforcer 204 in FIG. 2 is implemented as shown. In the example shown, an unconstrained PRBS is input to bit flipper 600 a bit at a time. Bit flipper 600 is configured to flip bits in the unconstrained PRBS when so instructed by transition counter 606 or run counter 610. Transition counter 606 counts the (current) number of consecutive transitions and run counter 610 counts a (current) run length of a run of 0's or a run of 1's. Transitions are detected by XOR 604 (which takes as inputs the unconstrained PRBS and the output of delay 602) and runs are detected by XNOR 608 (which takes as inputs the unconstrained PRBS and the output of delay 602). As such, the output of XOR 604 is connected to transition counter 606 and the output of XNOR 608 is connected to run counter 610.

In the event transition counter 606 detects that the maximum number of transitions would be exceeded by the current unconstrained bit at the input of bit flipper 600, the flip signal from transition counter 606 to bit flipper 600 would be asserted, causing bit flipper 600 to output a bit which is the flipped or inverted value of the current bit at its input (i.e., causing the run of transitions to end). Similarly, if run counter 610 determines that the current unconstrained bit at the input of bit flipper 600 would exceed the maximum run length, the flip signal is asserted, causing bit flipper 600 to output a bit which is a flipped version of the bit at its input. The output of delay 602 is an MTR and RLL constrained bit sequence; the MTR and RLL constrained bit sequence is output (at least in this example) a bit at a time.

Although this embodiment shows a single delay element and two counters, some other embodiments may use some other components or architecture. For example, an alternative system may include an array of D flip flops and the outputs of the D flip flops are combined using (e.g., memory less) combinatorial logic (e.g., XOR or XNOR gates to detect transitions and runs, respectively, plus AND gates at the outputs of the XOR or XNOR gates to detect multiple transitions in a row, or a run length greater than one) to determine when to flip a bit (e.g., because an MTR constraint or an RLL constraint would otherwise be violated if the bit were not flipped).

Figure 7:
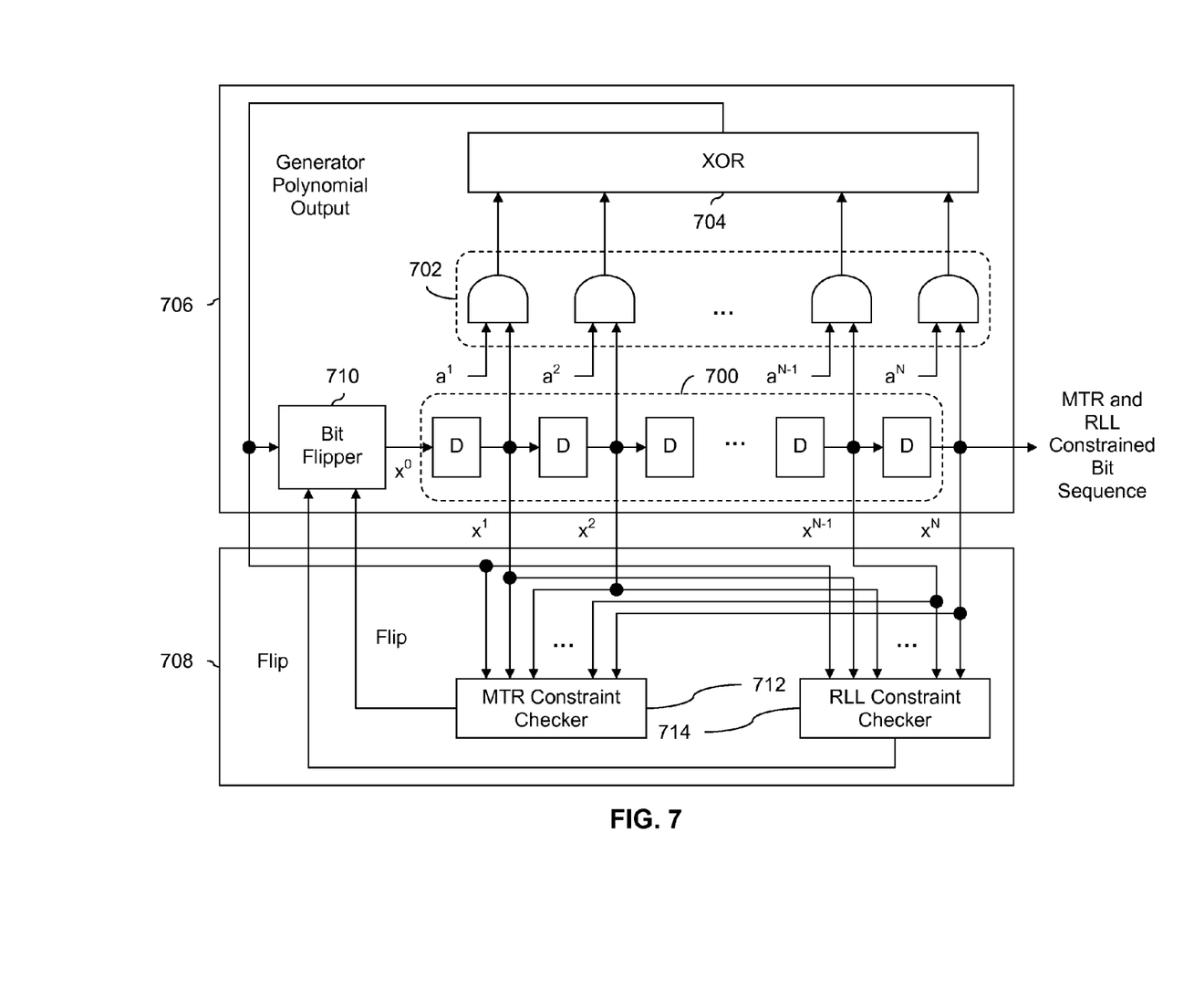
FIG. 7 is a diagram showing a more detailed embodiment of a feedback signal generator.

FIG. 7 is a diagram showing a more detailed embodiment of a feedback signal generator. In some embodiments, generator 302 in FIG. 3 is implemented as generator 706 shown here and/or feedback constraint enforcer 304 in FIG. 3 is implemented as feedback constraint enforcer 708 shown here.

Generator 706 includes a chain of D flip flops (700) and an array of AND gates (702), each AND gate of which takes a coefficient as input and an output of one of the D flip flops in chain 700. The outputs of the AND gates are input to XOR gate 704 which outputs a generator polynomial output. In this example, the system is a feedback system where generation of the unconstrained bit sequence is based at least in part on or is otherwise affected by the flipping of bits in order to satisfy a constraint. In this particular example, bit flipper 710 flips the generator polynomial output if so instructed by MTR constraint checker 712 or RLL constraint checker 714. Both constraint checkers 712 and 714 take as input the generator polynomial output, as well as the outputs of the D flip flops in chain 700 (i.e., $x^1$ through $x^N$).

In some embodiments, MTR constraint checker 712 and/or RLL constraint checker 714 is implemented without the use of counters, for example using strictly combinational logic (e.g., AND gates, OR gates, etc.). The following figures show an example of an MTR constraint checker and an RLL constraint checker.

Figure 8:
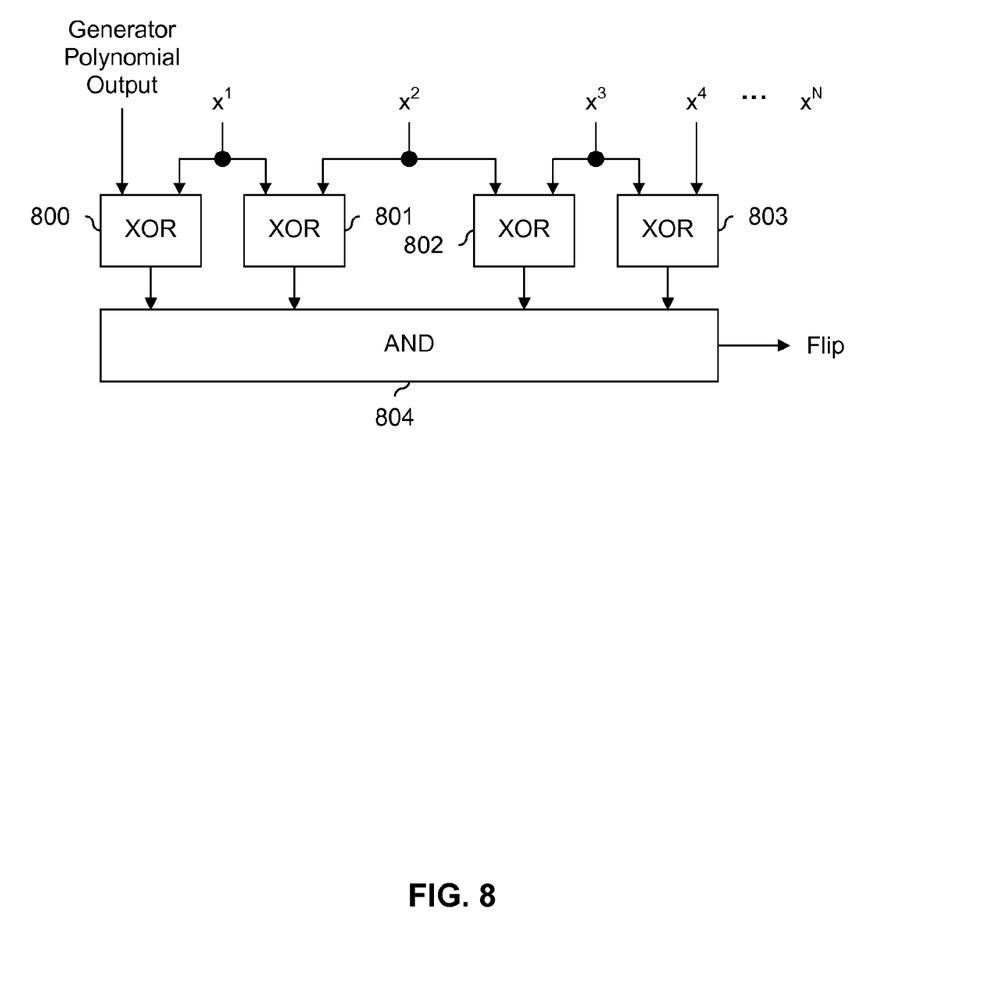
FIG. 8 is a diagram showing an embodiment of an MTR constraint checker configured to enforce an MTR constraint of 3.

FIG. 8 is a diagram showing an embodiment of an MTR constraint checker configured to enforce an MTR constraint of 3. For clarity and to demonstrate the technique, the exemplary MTR constraint checker shown here is in a fixed or hardcoded state, where the only MTR constraint able to be enforced by the system is an MTR constraint of 3. In some other embodiments, a constraint checker (MTR or otherwise) is configurable or otherwise programmable, for example so that firmware, a user, or some other entity is able to specify a desired constraint to enforce. In some embodiments, MTR constraints can be changed dynamically (i.e., on the fly), for example so that the MTR constrained signal which is generated varies over time.

The generator polynomial output and $x^1$ are input into XOR 800, $x^1$ and $x^2$ are input into XOR 801, $x^2$ and $x^3$ are input into XOR 802, and $x^3$ and $x^4$ are input into XOR 803. The outputs of XOR gates 800-803 are input to AND 804, which outputs a flip signal. XOR gates 800-803 are used to detect transitions between adjacent bits in an unconstrained sequence, and AND 804 flags when there would be 4 transitions in a row, which would violate the MTR constraint of 3. In the event the output of AND 804 is high, a bit flipper may be used to flip the generator polynomial output (e.g., $x^0$=~ (generator polynomial output)). Otherwise, the flip signal is low and the generator polynomial output is not flipped (e.g., $x^0$=(generator polynomial output)). In this particular example, inputs $x^5$ through $x^N$ are not input to any logic in order to clearly show the technique; in some other embodiments, some or all of those inputs are input to additional XOR gates.

Figure 9:
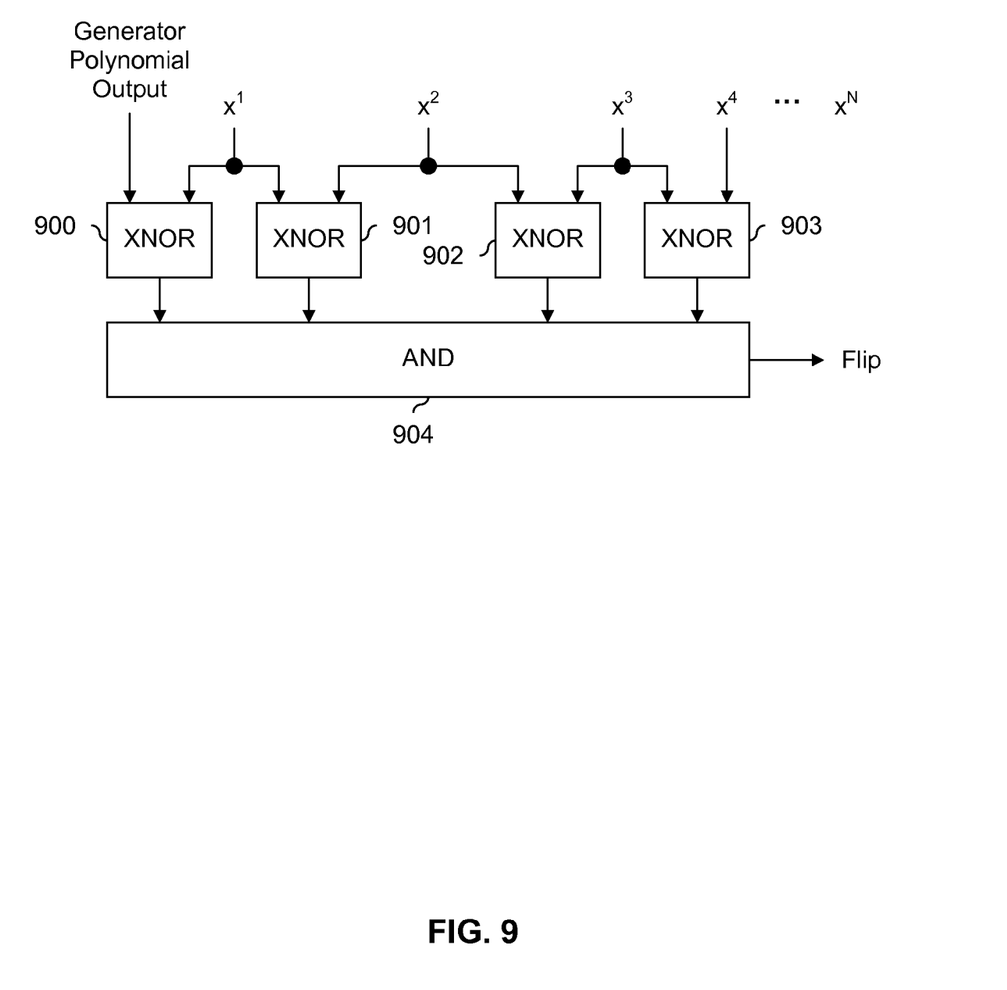
FIG. 9 is a diagram showing an embodiment of an RLL constraint checker configured to enforce an RLL constraint of 3.

FIG. 9 is a diagram showing an embodiment of an RLL constraint checker configured to enforce an RLL constraint of 3. As with FIG. 8, the constraint checker shown is in a fixed or hardcoded state to clearly show the technique, but all embodiments are not necessarily so constrained.

The generator polynomial output and $x^1$ are input into XNOR 900, $x^1$ and $x^2$ are input into XNOR 901, $x^2$ and $x^3$ are input into XNOR 902, and $x^3$ and $x^4$ are input into XNOR 903. The outputs of XNOR gates 900-903 are input to AND 904, which outputs a flip signal. XNOR gates 900-903 are used to detect back-to-back 0's or 1's in an unconstrained sequence, and AND 904 flags when there would be 4 0's in a row or 4 1's in a row, which would violate the RLL constraint of 3. If the RLL constraint of 3 is violated, the generator polynomial output is flipped (e.g., $x^0$=~(generator polynomial output)).

Figure 10:
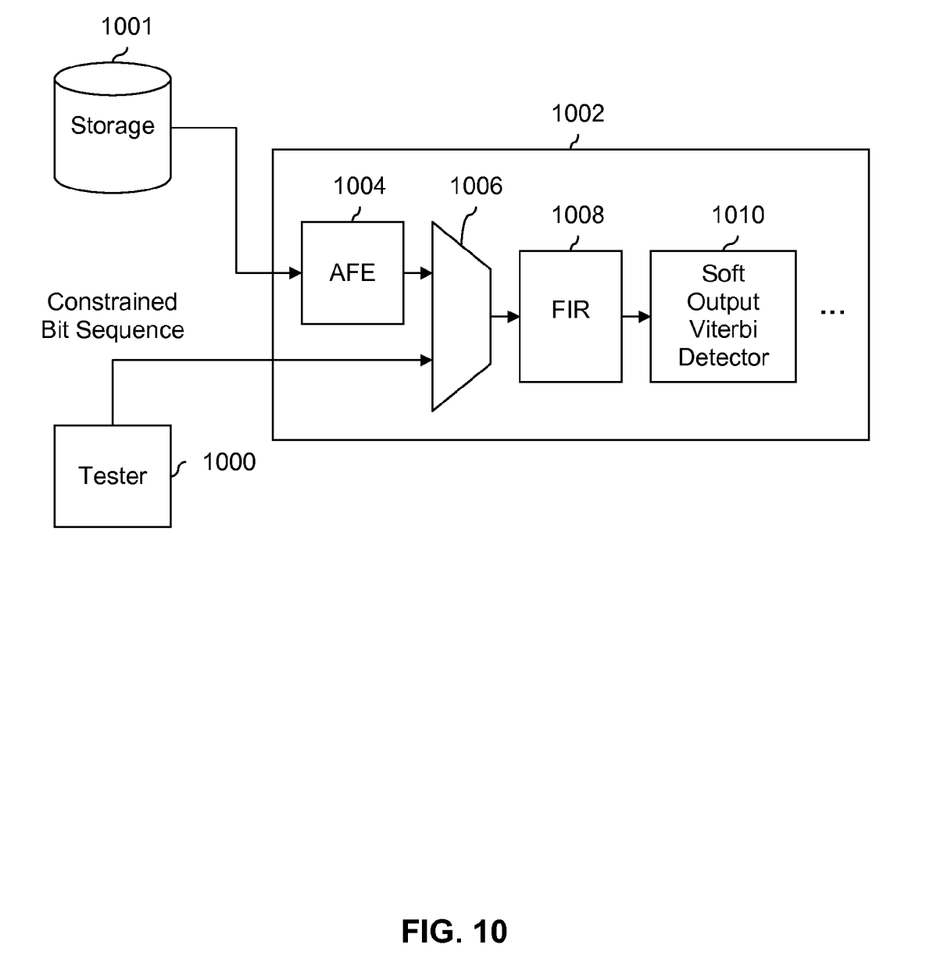
FIG. 10 is a diagram showing an embodiment of a system for training or testing.

FIG. 10 is a diagram showing an embodiment of a system for training or testing. In the example shown, tester 1000 is configured to generate a constrained bit sequence (e.g., MTR and/or RLL constrained) using the techniques described herein. The constrained bit sequence is passed to the input of multiplexer 1006, which is included in storage controller 1002. In some embodiments, storage controller 1002 is a semiconductor and (e.g., prior to sale) the semiconductor is tested (e.g., to confirm that the system operates at a desired level of performance) and/or trained (e.g., to set system parameters). During a non-operational mode (e.g., during testing or training), multiplexer 1006 is configured to output the constrained bit sequence generated by tester 1000 to finite impulse response (FIR) 1008. During a normal mode of operation, multiplexer 1006 is configured to pass on the output of analog front end (AFE) 1004 which obtains information from storage 1001 (e.g., hard disk storage). In some embodiments, the constrained bit sequence generated by tester 1000 is used to test storage controller 1002 and/or train parameters associated with soft output Viterbi detector 1010.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of generating a signal, comprising:
generating an unconstrained random bit sequence;
using a processor to modify the unconstrained random bit sequence to satisfy a constraint, including by:
receiving constraint settings, including: (1) a block length and (2) a maximum number of consecutive events that are permitted to be in a row, wherein an event includes a transition or a run; and
checking that a block, having the specified block length, from the unconstrained random bit sequence does not exceed the specified maximum number of consecutive events, wherein enforcement of the maximum number of consecutive events does not straddle block boundaries; and
outputting the modified random bit sequence.

2. The method of claim 1, wherein the method is performed by one or more of the following: a tester, a semiconductor, an application-specific integrated circuit (ASIC), a field-programmable gate array (FPGA), or an embedded microprocessor.

3. The method of claim 1, wherein the constraint includes one or more of the following: a run length limited (RLL) constraint or a maximum transition run (MTR) constraint.

4. The method of claim 1, wherein obtaining the unconstrained random bit sequence includes one or more of the following: generating the unconstrained random bit sequence using a seed, generating the unconstrained random bit sequence using a generator polynomial, or generating the unconstrained random bit sequence using a feedback signal associated with modification of the unconstrained random bit sequence to satisfy the constraint.

5. The method of claim 1, wherein the modified random bit sequence is used to train a detector.

6. The method of claim 5, wherein the detector includes a soft output Viterbi detector.

7. A system for generating a signal, comprising:
a bit sequence generator configured to generate an unconstrained random bit sequence;
a constraint enforcer configured to modify the unconstrained random bit sequence to satisfy a constraint, including by:
receiving constraint settings, including: (1) a block length and (2) a maximum number of consecutive events that are permitted to be in a row, wherein an event includes a transition or a run; and
checking that a block, having the specified block length, from the unconstrained random bit sequence does not exceed the specified maximum number of consecutive events, wherein enforcement of the maximum number of consecutive events does not straddle block boundaries; and
an interface configured to output the modified random bit sequence.

8. The system of claim 7, wherein the system includes one or more of the following: a tester, a semiconductor, an application-specific integrated circuit (ASIC), a field-programmable gate array (FPGA), or an embedded microprocessor.

9. The system of claim 7, wherein the constraint includes one or more of the following: a run length limited (RLL) constraint or a maximum transition run (MTR) constraint.

10. The system of claim 7, wherein the processor is configured to obtain the unconstrained random bit sequence, including by one or more of the following: generating the unconstrained random bit sequence using a seed, generating the unconstrained random bit sequence using a generator polynomial, or generating the unconstrained random bit sequence using a feedback signal associated with modification of the unconstrained random bit sequence to satisfy the constraint.

11. The system of claim 7, wherein the modified random bit sequence is used to train a detector.

12. The system of claim 11, wherein the detector includes a soft output Viterbi detector.

13. A computer program product for generating a signal, the computer program product being embodied in a non-transitory computer readable storage medium and comprising computer instructions for:
generating an unconstrained random bit sequence;
modifying the unconstrained random bit sequence to satisfy a constraint, including by:
receiving constraint settings, including: (1) a block length and (2) a maximum number of consecutive events that are permitted to be in a row, wherein an event includes a transition or a run; and
checking that a block, having the specified block length, from the unconstrained random bit sequence does not exceed the specified maximum number of consecutive events, wherein enforcement of the maximum number of consecutive events does not straddle block boundaries; and
outputting the modified random bit sequence.

14. The computer program product of claim 13, wherein the computer program product is included in a tester.

15. The computer program product of claim 13, wherein the constraint includes one or more of the following: a run length limited (RLL) constraint or a maximum transition run (MTR) constraint.

16. The computer program product of claim 13, wherein the computer instructions for obtaining the unconstrained random bit sequence include computer instructions for one or more of the following: generating the unconstrained random bit sequence using a seed, generating the unconstrained random bit sequence using a generator polynomial, or generating the unconstrained random bit sequence using a feedback signal associated with modification of the unconstrained random bit sequence to satisfy the constraint.

17. The computer program product of claim 13, wherein the modified random bit sequence is used to train a detector.

18. The computer program product of claim 17, wherein the detector includes a soft output Viterbi detector.

* * * * *